(12) United States Patent
Huo et al.

(10) Patent No.: US 9,286,277 B2
(45) Date of Patent: Mar. 15, 2016

(54) INPUTTING IN A TEXTBOX

(75) Inventors: Zhen Zhong Huo, Beijing (CN); Jia Zou, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 556 days.

(21) Appl. No.: 13/565,016

(22) Filed: Aug. 2, 2012

(65) Prior Publication Data
US 2013/0111338 A1 May 2, 2013

(30) Foreign Application Priority Data
Oct. 31, 2011 (CN) .......................... 2011 1 0337157

(51) Int. Cl.
G06F 17/24 (2006.01)
G06F 17/21 (2006.01)

(52) U.S. Cl.
CPC .............. G06F 17/24 (2013.01); G06F 17/212 (2013.01)

(58) Field of Classification Search
CPC ....... G06F 17/20; G06F 17/21; G06F 17/211; G06F 17/212; G06F 3/0484
See application file for complete search history.

(56) References Cited

U.S. PATENT DOCUMENTS

| | | | |
|---|---|---|---|
| 6,256,650 B1 | 7/2001 | Cedar et al. | |
| 6,441,824 B2 | 8/2002 | Hertzfeld | |
| 6,605,122 B1 | 8/2003 | Hearn et al. | |
| 7,043,689 B2 | 5/2006 | Linker et al. | |
| 7,676,743 B2 | 3/2010 | Seeler | |
| 2002/0113810 A1 | 8/2002 | Radtke et al. | |
| 2005/0125377 A1* | 6/2005 | Kotler et al. | 707/1 |
| 2006/0005115 A1 | 1/2006 | Ritter et al. | |
| 2008/0109752 A1* | 5/2008 | Bayley et al. | 715/800 |
| 2009/0254814 A1 | 10/2009 | Lai et al. | |
| 2010/0175021 A1* | 7/2010 | Ferrara et al. | 715/784 |
| 2012/0017159 A1* | 1/2012 | Roh et al. | 715/760 |
| 2012/0281011 A1* | 11/2012 | Reichenstein | 345/596 |
| 2012/0290967 A1* | 11/2012 | Scott et al. | 715/780 |
| 2013/0174120 A1* | 7/2013 | Kalaidjian | 717/113 |

OTHER PUBLICATIONS

"Stackoverflow: How to expand a text area when click on", (referred to as OnBlurRef in the Office Action), retrieved from http://stackoverflow.com/questions/5648464/how-to-expand-a-text-area-when-click-on.*

Lin, Xiaofan, "Predictive Text Fitting", Springer link—6th International Symposium on Smart Graphics, Jul. 23-25, 2006, Vancouver, Canada. 11 pages.

* cited by examiner

*Primary Examiner* — Stephen Hong
*Assistant Examiner* — Sanchita Roy
(74) *Attorney, Agent, or Firm* — Marcia L. Doubet

(57) ABSTRACT

Inputting in a textbox comprises: monitoring a related event of inputting text in a textbox; providing an extended window for displaying excess text in response to detecting that the text exceeds the textbox; hiding the extended window, and storing a state of inputted context and the inputted text in response to a monitored event that the textbox loses focus; and displaying the extended window and the textbox, with their text, according to the stored state of inputted context in response to monitoring again the related event of inputting text in the textbox after monitoring the event that the textbox loses the focus. A global view can thus be provided for a user, whereby the user is capable of seeing at one time the content as a whole inputted by himself/herself, and immediately locating the last text inputted when the user leaves the textbox and then comes back for inputting.

19 Claims, 6 Drawing Sheets

1001
The extended window, the text in the extended window, the textbox, and the text in the textbox are displayed in response to a monitored event that the textbox is edited again after the event where the textbox loses the focus

1002
The editing operation is applied to the text in the textbox in response to a monitored event of the editing operation on the text in the textbox

1003
A series of operations are performed in response to a monitored event of the editing operation on the text in the extended window

FIG. 11

INPUTTING IN A TEXTBOX

BACKGROUND

The present invention generally relates to computer inputting, and more particularly to inputting in a textbox.

A textbox is used for an application program to obtain input data from a user, and is a very important and frequently used user interface (UI) component of a current application program. The textbox includes a single-line textbox and a multiple-line textbox. For example, a textbox is commonly used to input a user name, a password, an operation parameter, and the like in the current application program. In addition, the textbox is also a commonly used input manner for a webpage access.

In the current application program or webpage, once designing the application program and the webpage is finished, a space size of the textbox created therein is fixed. In the inputting, three ways are adopted to display the textbox for inputting the text and the inputted text in general, as shown in FIGS. 1, 2, and 3.

Figure 1:
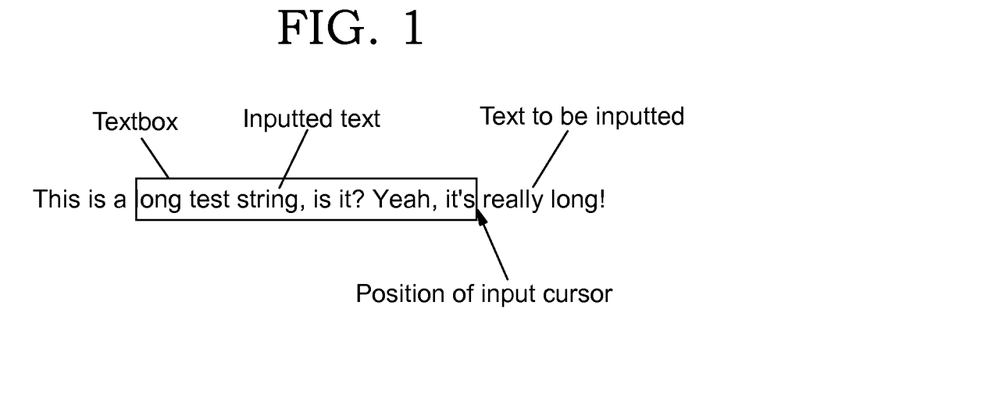
FIG. 1 shows a displaying manner where a textbox only retains last inputted text.

FIG. 1 shows a displaying manner where the textbox only retains last inputted text. In FIG. 1, as the inputted text fills the whole textbox, the previously inputted text moves forward and disappears, whereas only the situation that the text is being inputted is displayed in the textbox. At last, only the last text having a length equal to the length of the textbox remains in the textbox.

Figure 2:
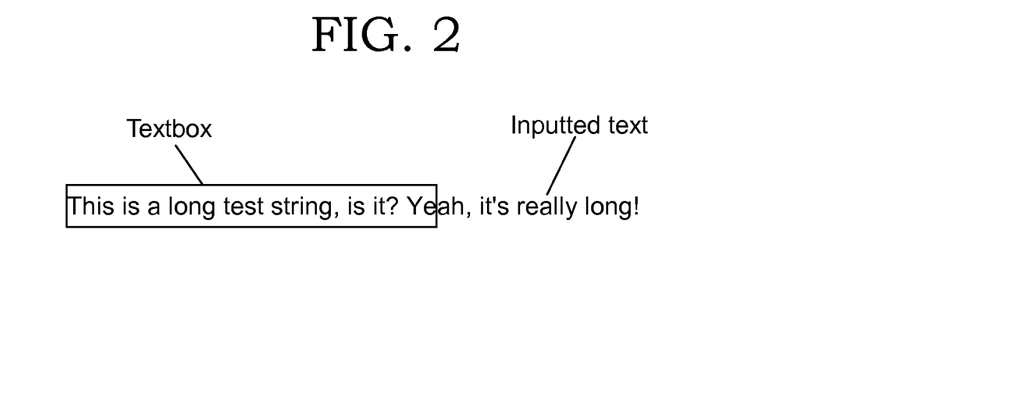
FIG. 2 shows a displaying manner where a textbox only retains initially inputted text.

FIG. 2 shows a displaying manner where the textbox only retains initially inputted text. According to FIG. 2, only the text from beginning of the inputted text to end of the textbox is displayed in the textbox, and currently inputted text is not within the textbox and cannot be seen by the user.

Figure 3:
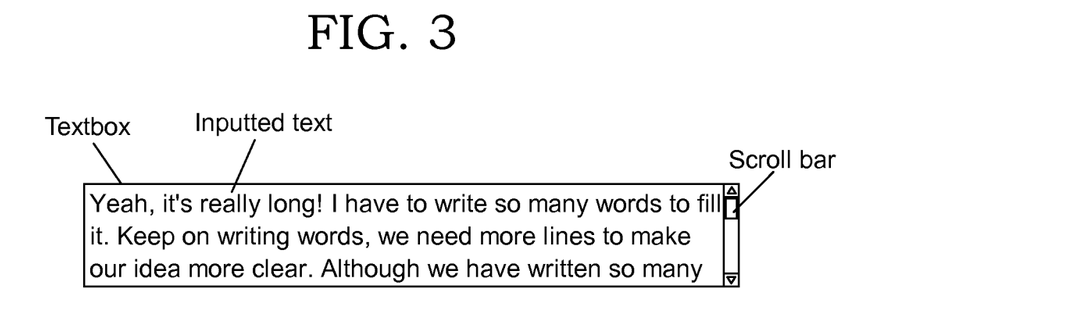
FIG. 3 shows a displaying manner where inputted text is displayed by a multiple-line textbox with a scroll bar.

FIG. 3 shows a displaying manner where the inputted text is displayed by the multiple-line textbox with a scroll bar. FIG. 3 schematically shows a vertical scroll bar, but those skilled in the art will understand that a horizontal scroll bar is of the same principle. According to FIG. 3, the user can see the whole document by dragging the scroll bar, but amount of the text displayed in the textbox is still fixed.

That is to say, although no limitation is imposed on the length of the inputted text in the foresaid three inputting ways, the length of the text displayed at one time is consistent with the length of the textbox, that is, text of a fixed length is displayed at one time.

BRIEF SUMMARY

According to one aspect of the present invention, there is provided a method of inputting in a textbox, comprising: monitoring an event of inputting text in a textbox; providing an extended window for displaying excess text in response to the monitored event detecting that the text inputted in the textbox exceeds the textbox; hiding the extended window, and storing a state of inputted context and all the inputted text, in response to a monitored event that the textbox loses a focus; and displaying the extended window, the text in the extended window, and the text in the textbox according to the stored state of inputted context in response to monitoring again the event of inputting text in the textbox after monitoring the event that the textbox loses the focus.

An embodiment of the disclosure may be provided as a method, system, or computer program product.

BRIEF DESCRIPTION OF THE SEVERAL VIEWS OF THE DRAWINGS

The above and other objects, features, and advantages of the present invention will become more apparent by the more detailed description of exemplary embodiments of the present invention as illustrated in the accompanying drawings, wherein the same reference numbers generally denote the same parts in the exemplary embodiments of the present invention.

DETAILED DESCRIPTION

Preferred embodiments of the present invention will be described in more detail with reference to the accompanying drawings, in which preferred embodiments of the present invention are shown. However, the present invention can be implemented in various forms, and should be understood as not being limited to the embodiments described herein. In contrast, these embodiments are provided in order to make the present invention more apparent and complete and to fully convey the scope of the invention to those of skill in the art.

The methods of inputting in a textbox which were discussed above with reference to FIGS. 1-3 are sometimes very inconvenient for users. The user often inputs plenty of text in the textbox, and needs a global inputting view to see the whole content inputted by himself/herself. Moreover, when leaving the textbox and then coming back, the user needs to be capable of quickly locating the previously-inputted text. Accordingly, there is a need for providing a method and system of inputting in a textbox, which can give a global view for inputting the text to a user and immediately locate the text inputted last time when the user leaves the textbox and then comes back, so that usability of the input textbox is improved.

Figure 4:
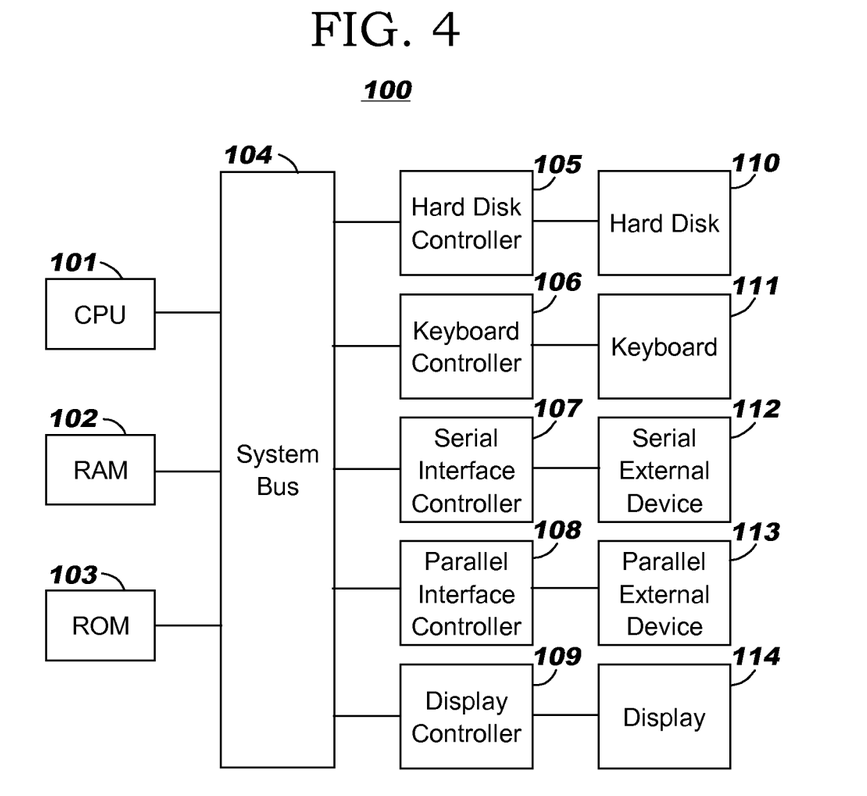
FIG. 4 shows a block diagram of an exemplary computer system adapted for implementing an embodiment of the present invention.

FIG. 4 shows a block diagram of an exemplary computer system 100 adapted for implementing an embodiment of the present invention. As shown, the computer system 100 can include a CPU (Central Processing Unit) 101, a RAM (Random Access Memory) 102, a ROM (Read Only Memory) 103, a system bus 104, a hard disk controller 105, a keyboard controller 106, a serial interface controller 107, a parallel interface controller 108, a display controller 109, a hard disk 110, a keyboard 111, a serial external device 112, a parallel external device 113, and a display 114. In these devices, those coupled with the system bus 104 are the CPU 101, the RAM 102, the ROM 103, the hard disk controller 105, the keyboard controller 106, the serial interface controller 107, the parallel interface controller 108, and the display controller 109. The hard disk 110 is coupled with the hard disk controller 105, the keyboard 111 is coupled with the keyboard controller 106, the serial peripheral device 112 is coupled with the serial interface controller 107, the parallel peripheral device 113 is coupled with the parallel interface controller 108, and the display 114 is coupled with the display controller 109. It should be understood that the structural block diagram illustrated in FIG. 4 is shown for the purpose of an example only, not a limitation to the scope of the present invention. In some cases, some devices can be added or removed in dependence on a specific situation.

Figure 5:
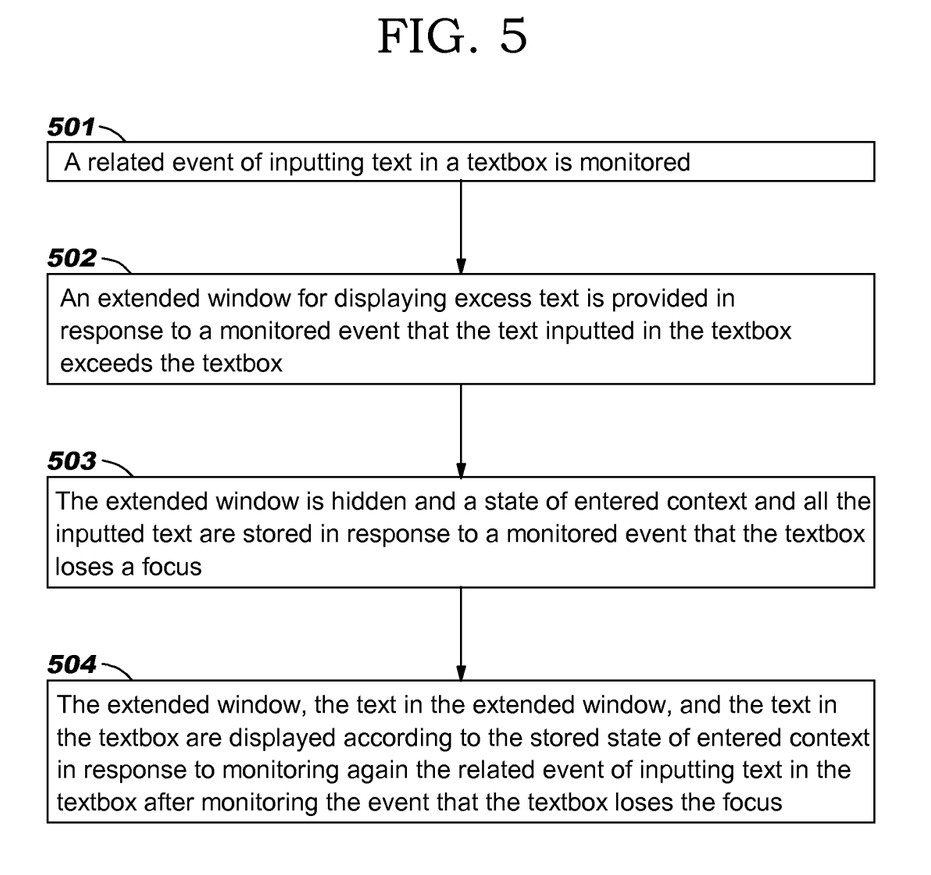
FIG. 5 shows a method flowchart of a method of inputting in a textbox according to one embodiment of the present invention.

An embodiment of the present invention is directed to inputting in a textbox. FIG. 5 shows a method flowchart of a method of inputting in a textbox of the present invention. (Note that the term "inputting" is considered to be a synonym for "entering" with regard to text.) According to FIG. 5, at 501, a related event of inputting text in a textbox is monitored. At 502, an extended window for displaying excess text is provided in response to the monitored event detecting that the text inputted in the textbox exceeds the textbox. At 503, the extended window is hidden and a state of inputted context and all the inputted text are stored in response to the monitored event that the textbox loses a focus. And at 504, the extended window, the text in the extended window, and the text in the textbox are displayed according to the stored state of inputted context in response to monitoring again the related event of inputting text in the textbox after monitoring the event that the textbox loses the focus.

Figure 6:
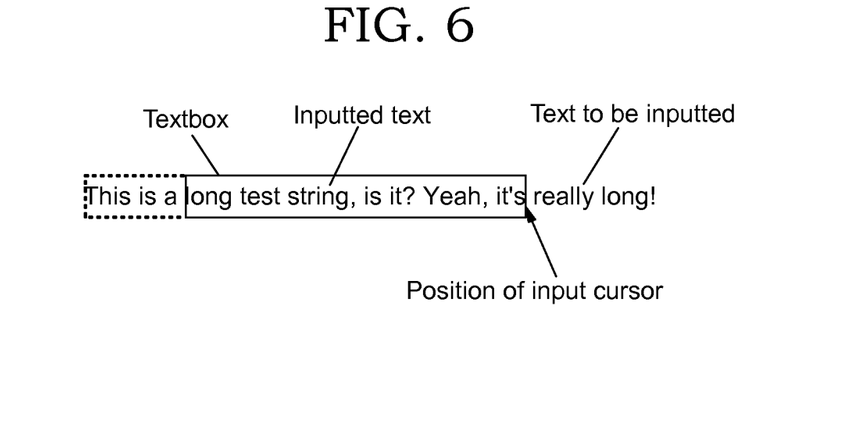
FIG. 6 shows an effect obtained by implementing the method shown in FIG. 5 on the textbox in FIG. 1.

FIG. 6 shows an effect obtained by implementing the method shown in FIG. 5 on the example textbox from FIG. 1. It can be seen from FIG. 6 that a user is capable of seeing the entire content inputted by himself/herself at one time with a global view of inputting. Moreover, as the inputted text exceeding the textbox increases, the extended window can be enlarged automatically. Herein, the excess text is displayed in the extended window, and the extended window and the textbox can employ different frame-style structures. For example, in FIG. 6, the extended window adopts a dashed line, which is thereby distinguished from a solid line structure for the textbox, and the extended window can also adopt other manners such as different color, different width of the line, and the like. In general, currently edited text is placed in the textbox, and the excess text, which is obtained by removing the text in the textbox from the whole inputted text, is placed in the extended window, such that the extended window is enlarged gradually as the excess text increases gradually.

Figure 7:
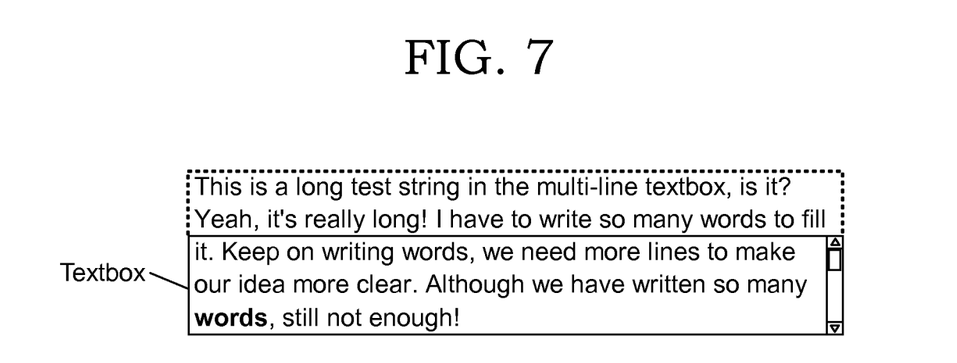
FIG. 7 shows a situation where an extended window is always located above a textbox, with reference to the example shown in FIG. 3, when text is inputted in the textbox.
Figure 8:
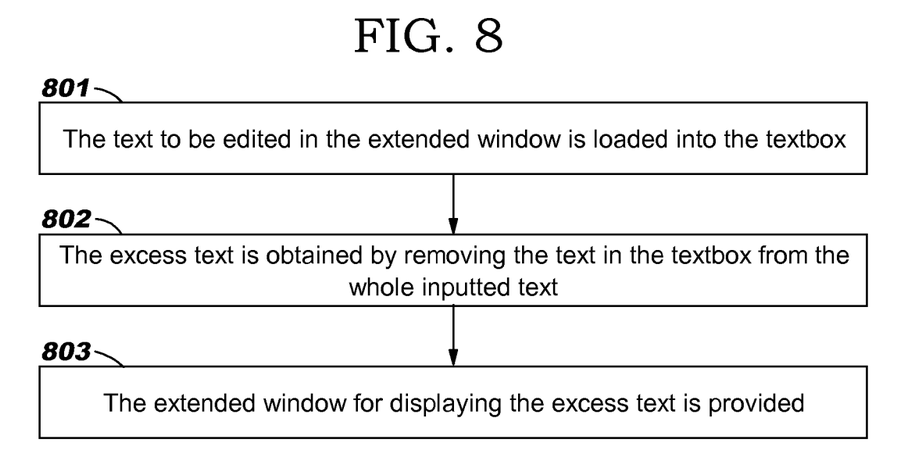
FIG. 8 shows a method of operation of editing text in an extended window.
Figure 9:
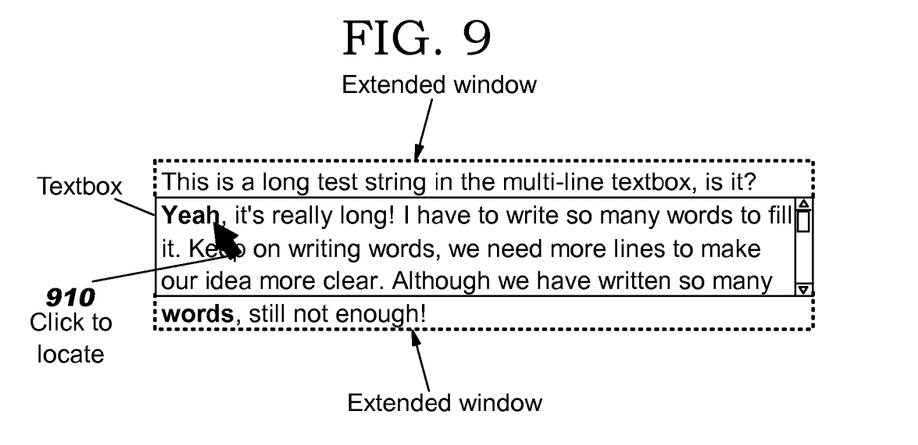
FIG. 9 shows a situation where an extended window is located above and below a textbox at the same time.

In one embodiment, the extended window is located around the textbox, and the text in the extended window concatenates to the text in the textbox smoothly. The extended window can be located on the left side, right side, top, or bottom of the textbox, or even located on the left and right sides or top and bottom of the textbox at the same time. For example, when the text is inputted in the textbox as shown in FIG. 1, the extended window is always located on the left side of the textbox, as shown in FIG. 6. FIG. 7 shows a situation where the extended window is always located above the textbox when the text is inputted in the textbox as shown in FIG. 3. In such manner, the inputted text concatenates to the text in the textbox smoothly to facilitate a user's reading. In the process of inputting in the textbox, if the user finds that a problem occurs in the inputted information which is now in the extended window, and it is necessary to edit the information in the extended window, then the method implements operations of editing the text in the extended window as shown in FIG. 8 in response to the monitored event of the operations of editing the text in the extended window. According to FIG. 8, at 801, the text to be edited from the extended window is loaded into the textbox. At 802, the excess text is obtained by removing the text in the textbox from the whole inputted text. And at 803, the extended window for displaying the excess text is provided. Herein, similarly, the extended window is located around the textbox, and excess text in the extended window concatenates to the text in the textbox smoothly. At this time, with respect to the textbox as shown in FIG. 1, the extended window may be located on the left and right sides of the textbox at the same time; and with respect to the textbox as shown in FIG. 3, the extended window may be located above and below the textbox at the same time. FIG. 9 shows a situation where the extended window is located above and below the textbox at the same time. In such manner, the whole inputted text is enabled to concatenate smoothly so that the user reads it more conveniently.

When the event that the textbox loses the focus is detected by the monitor (denoted, for example, by the input prompting cursor or the input prompt of the textbox disappearing, or the textbox frame being changed from the highlighted activation status to the non-highlighted status), then the extended window will be hidden, but both of the state of inputted context and all the inputted text have now been stored. At this time, the last text corresponding to the cursor input can be displayed in the textbox, or the initial text of the whole inputted text can also be displayed, which can be defined by the user according to his/her own requirement. The state of inputted context to be stored can include a variety of types, which can be defined by the user, but include at least a position of the cursor when the focus is lost.

After the focus is lost, the user may also desire to see the text as a whole again to determine (for example) whether a careless mistake was made in his/her own input, or the user may want to modify or edit the inputted text again. The user can click on text displayed in the extended window, causing that text to be automatically moved into the textbox again (for example, for editing). Since plenty of text may have already been edited before the focus is lost, and another operation which is performed accidently or forcedly caused the focus to be lost, but the user still desires to return to the original state, it is necessary to store the state of inputted context, particularly the cursor position when the focus is lost, so that it is easy to return to the original inputting state after many contents are inputted. Usability of the textbox is thereby improved. Specifically, firstly the text related to the cursor position when the focus is lost is loaded into the textbox; then the excess text is obtained by removing the text in the textbox from the whole inputted text (i.e., from the entirety of the inputted text); and finally the extended window is provided in order to display the excess text. The text related to the cursor position when the focus was lost can be determined, for example, by the user having placed the cursor position at beginning, end, or middle position of the textbox (as shown at 910 in FIG. 9), so that the user will see the related text at a glance. In such manner, the textbox itself is used as an input box in fact, while the extended window itself is only a component that enables seeing all the inputted contents.

Figure 10:
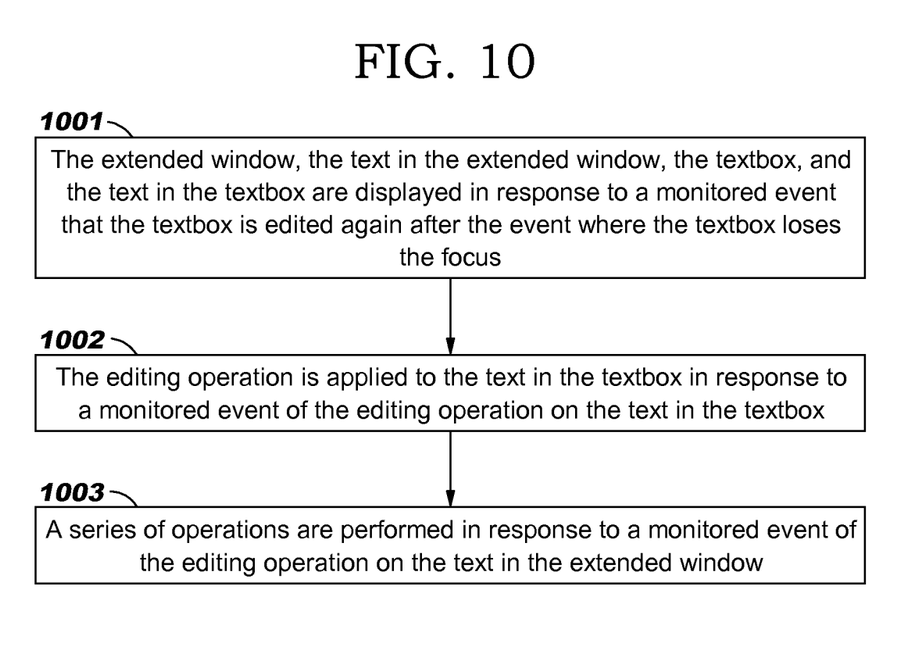
FIG. 10 shows a flowchart of editing text in a textbox or an extended window again, after an event where the textbox loses a focus.

FIG. 10 shows a flowchart of editing text in a textbox or an extended window again after an event where the textbox loses focus. According to FIG. 10, at 1001, the extended window, the text in the extended window, the textbox, and the text in the textbox are displayed according to the stored state of inputted context in response to the monitored event that the textbox is edited again after the event where the textbox loses the focus. That is, all the inputted contents are displayed at one time, and the textbox itself is always in a display state, thus it is not mentioned herein. At this time, the user can edit the text in the textbox, and can also edit the text in the extended window. Specifically, at 1002, the editing operation is applied to the text in the textbox in response to the monitored event of the editing operation on the text in the textbox. At 1003, a series of operations are performed in response to the monitored event of the editing operation on the text in the extended window. Specifically, the series of operations includes: first loading the text to be edited from the extended window into the textbox; then obtaining the excess text by removing the text in the textbox from the whole inputted text; providing the extended window to display the excess text; and at last, applying the editing operation to the text now loaded into the textbox. Preferably, the extended window is located around the textbox, and the excess text in the extended window concatenates to the text in the textbox smoothly. Thus, it is possible to edit the text in the extended window by inputting in the textbox.

Preferably, before applying the editing operation to the text in the textbox at 1002, the method further comprises: locating the text in the textbox to which the editing operation is directed; placing an operator on the text to which the editing operation is directed; and receiving an operation command including at least one operation of viewing, inserting, deleting, and modifying. In addition, preferably, before applying the editing operation to the text now loaded into the textbox, the method further comprises: locating the text now loaded into the textbox to which the editing operation is directed; placing an operator on the text to which the editing operation is directed; and receiving an operation command including at least one operation of viewing, inserting, deleting, and modifying.

In the above method, the involved extended window is enlarged as the text contained therein increases, and the specific size of the extended window can be calculated according to a font size and layout arrangement of the text currently contained in the extended window. For example, with respect to the extended window shown in FIG. 6, assume that the font is Times New Roman, the font size is 12, and the arrangement is horizontal. A horizontal length occupied by the text in the extended window can then be calculated by adding a necessary interspace from the extended window frame; a width of the extended window can be calculated; and (for a single-line textbox as illustrated by FIG. 6) a height can be maintained to be consistent with the textbox. With respect to the extended window shown in FIG. 7, the width of the extended window consistent with the textbox can be maintained, while the height of the extended window varies as the inputted text increases, and so on. All these can be set by the user.

Figure 11:
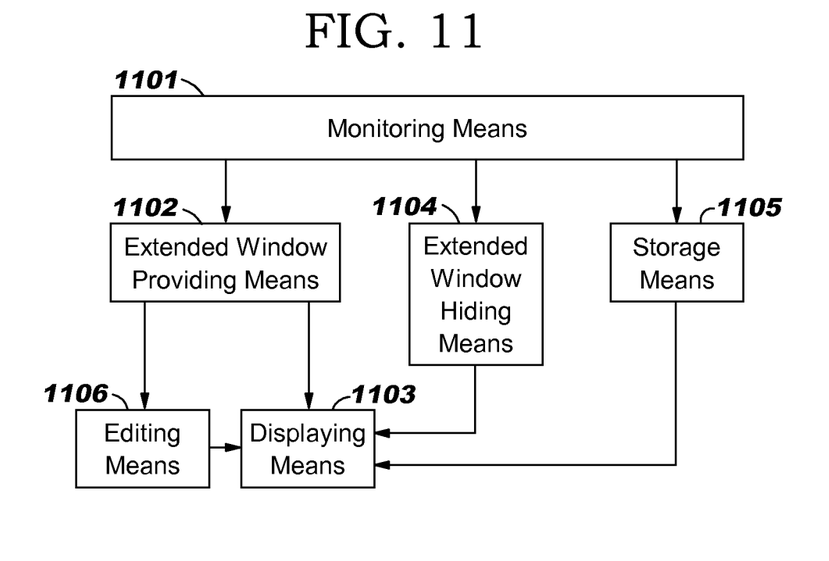
FIG. 11 shows a structural block diagram of a system of inputting in a textbox.

In the same inventive concept, the present invention also discloses a system of inputting in a textbox, and FIG. 11 shows a structural block diagram of the system. According to FIG. 11, the system includes: a monitoring means 1101 configured to monitor a related event of inputting text in a textbox; an extended window providing means 1102 configured to provide an extended window in response to the event monitored by the monitoring means that the text inputted in the textbox exceeds the textbox; a displaying means 1103 configured to display the textbox, the extended window, the text in the extended window, and the text in the textbox; an extended window hiding means 1104 configured to hide the extended window in response to the event monitored by the monitoring means that the textbox loses a focus; and a storage means 1105 configured to store a state of inputted context and all the inputted text in response to the event monitored by the monitoring means that the textbox loses the focus. The displaying means 1103 displays the extended window and the excess text in the extended window in response to the extended window providing means 1102 providing the extended window, and the displaying means 1103 displays the extended window, the excess text in the extended window, the textbox, and the text in the textbox according to the stored state of inputted context in response to the related event monitored again by the monitoring means that the text is inputted in the textbox, after previously monitoring the event that the textbox loses the focus.

In a preferred embodiment, the state of inputted context includes a cursor position when the focus is lost. The displaying means 1103 displaying the extended window, the text in the extended window, the textbox, and the text in the textbox according to the stored state of inputted context comprises: the displaying means 1103 loading the text related to the cursor position when the focus is lost into the textbox to be displayed; the extended window providing means 1102 removing the text in the textbox from the whole inputted text to obtain the excess text, and providing the extended window for the excess text; and the displaying means 1103 displaying the extended window, the text in the extended window, the textbox, and the text in the textbox.

In another embodiment, in response to the monitoring means 1101 monitoring the event of an editing operation on the text in the extended window, the displaying means 1103 loads the text to be edited from the extended window into the textbox; the extended window providing means 1102 removes the text now in the textbox from the whole inputted text to obtain the excess text and provides the extended window; and the displaying means 1103 displays the extended window and the text in the extended window. In this embodiment, the system as shown in FIG. 11 further comprises an editing means 1106 configured to apply the editing operation to the text now loaded into the textbox. Preferably, the editing means 1106 further comprises a locating means configured to locate the text now loaded into the textbox to which the editing operation is directed, and place an operator on the text to which the editing operation is directed (see, for example, 910 in FIG. 9); and a receiving means configured to receive an operation command including at least one operation of viewing, inserting, deleting, and modifying.

In the foresaid system, the excess text in the extended window concatenates to the text in the textbox smoothly, the extended window is enlarged as the excess text increases, and a size of the extended window is calculated according to a font size and layout arrangement of the excess text.

Hereinbefore, the method and system according to embodiments of the present disclosure are introduced in detail. The flowcharts and block diagrams in the drawings illustrate the architecture, functionality, and operation of possible implementations of systems, methods, and computer program products according to various embodiments of the present disclosure. In this regard, each block in the flowcharts or block diagrams may represent a module, program segment, or part of code which comprises one or more executable instructions for performing the specified logic function(s). It should also be noted that, in some alterative implementations, the functions noted in the blocks may also occur in an order other than that noted in the drawings. For example, two blocks consecutively shown may, in fact, be performed substantially in parallel, or sometimes they may be performed in a reverse order, depending upon the functionality involved. It will also be noted that each block of the block diagrams and/or flowcharts, and combinations of blocks in the block diagrams and/or flowcharts, can be performed by using a special purpose hardware-based system that executes the specified functions or operations, or by using a combination of a special purpose hardware and computer instructions.

Those skilled in the art will recognize that a plurality of aspects of the present disclosure may be embodied as a system, method, or computer program product. Accordingly, a plurality of aspects of the present disclosure may take the form of an entirely hardware embodiment, an entirely software embodiment (including firmware, resident software, microcode, etc.), or an embodiment combining software and hardware aspects that may all generally be referred to herein as a "circuit", "module", or "system". In addition, a plurality of aspects of the present disclosure may also take the form of a computer program product embodied in one or more computer-readable medium having computer-usable program code embodied therein.

Any combination of one or more computer-readable medium(s) can be used. The computer-readable medium can be a computer-readable signal medium or a computer-readable storage medium. For example, the computer-readable storage medium can be, but is not limited to, an electronic, magnetic, optical, electromagnetic, infrared, or semi-conductor system, apparatus, or device, or any combination thereof. More specific examples (a non-exhaustive list) of the computer-readable storage medium include the following: an electrical connection with one or more wires, a portable computer disk, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any appropriate combination thereof. In the context of this document, the computer-readable storage medium can be any tangible medium containing or storing a program for use by or in connection with an instruction execution system, apparatus, or device.

The computer-readable signal medium may include a propagated data signal propagated in a base band or as part of a carrier wave, in which the computer-readable program code is embodied. Such a propagated signal can adopt a variety of forms including, but not limited to, an electromagnetic signal, an optical signal, or any appropriate combination thereof. The computer-readable signal medium can be any computer-readable medium rather than a computer-readable storage medium, which is capable of transmitting, propagating, or transporting the program for use by or in connection with an instruction execution system, apparatus, or device. The program code contained on the computer-readable medium can be transmitted with any appropriate medium including, but not limited to, wireless, wireline, optical fiber cable, radio frequency (RF), or the like, or any appropriate combination thereof.

Computer program code for carrying out operations of the present disclosure may be written in any combination of one or more programming languages, including an object oriented programming language such as Java®, Smalltalk, C++, or the like and conventional procedural programming languages, such as the "C" programming language or similar programming languages. ("Java" is a registered trademark of Oracle Corporation in the United States, other countries, or both.) The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A plurality of aspects of the present disclosure were described with reference to the flowcharts and/or block diagrams of the method, apparatus (system), and computer program product of embodiments of the present disclosure. It is understood that each block of the flowcharts and/or block diagrams, and combinations of blocks in the flowcharts and/or block diagrams, can be implemented by computer program instructions. These computer program instructions may be provided to a processor of a general purpose computer, special purpose computer, or other programmable data processing apparatus, thereby producing a machine, such that the instructions, which execute by the computer or the other programmable data processing apparatus, create means for implementing the functions/operations specified in the block or blocks in the flowcharts and/or block diagrams.

These computer program instructions may also be stored in a computer-readable medium that can direct a computer or other programmable data processing apparatus to function in a particular manner, such that the instructions stored in the computer-readable medium produce an article of manufacture including instruction means implementing the functions/operations specified in the block or blocks in the flowcharts and/or block diagrams.

The computer program instructions may also be loaded onto a computer or other programmable data processing apparatus to cause a series of operational steps to be performed on the computer or other programmable data processing apparatus to generate a computer-implemented process, such that the instructions which execute on the computer or other programmable data processing apparatus provide processes for implementing the functions/operations specified in the block or blocks in the flowcharts and/or block diagrams.

It should also be noted that it is obvious that the components and/or steps discussed herein can be decomposed and/or recombined in the apparatus and system of the present disclosure. These decompositions and/or recombinations should be considered as equivalent solutions of the present disclosure. Moreover, carrying out the aforesaid series of processing can be naturally performed in a time sequence as the order illustrated, but it is not necessary to be performed in this time sequence. Some steps can be performed in parallel or separately with each other.

While the disclosure and the advantages thereof are described in detail, it should be understood that various changes, substitutions, and modifications can be made without departing from the spirit and scope of the present disclosure as defined by the appended claims. Moreover, in the application, terms "include", "comprise", or any other variation thereof are intended for non-exclusive inclusion, so that a procedure, method, article, or apparatus including a series of elements may comprise not only those elements, but also other elements which are not listed explicitly or the elements which are intrinsic to the procedure, method, article, or apparatus. Unless otherwise stated, an element defined by the statement "includes a . . . " does not exclude that another same element exists in the procedure, method, article, or apparatus including the element.

What is claimed is:
1. A method of entering text in a textbox, comprising:
monitoring an event of entering text in a textbox of a fixed length and having a visible boundary;
responsive to the monitored event detecting that entering the text overflows the length of the textbox, performing:

automatically providing an extended window for displaying overflowed text, without a user request for the extended window, wherein the extended window is positioned adjacent to, but separate and distinct from, the textbox; and iteratively displaying overflowed text in the extended window, while the monitoring continues to detect that entering the text overflows the length of the textbox and without the user request for the extended window, the overflowed text determined as text which has been entered but is not currently displayed in the textbox due to the overflowing;

automatically closing the extended window and storing a state, the state comprising all the entered text and a context of entering the text, while continuing to display the textbox, in response to monitoring an event that the textbox loses a focus for entering text and without a user request to close the extended window; and automatically reopening the extended window, redisplaying the overflowed text in the reopened extended window, and redisplaying in the textbox the text that was displayed in the textbox at a time of the monitored event that the textbox lost the focus for entering text, according to the stored state and without a user request to reopen the extended window, in response to monitoring again the event of entering text in the textbox after monitoring the event that the textbox lost the focus.

2. The method according to claim 1, wherein:
the context includes a position of a cursor in the textbox when the focus is lost; and
redisplaying the text in the textbox comprises loading the text in the textbox according to the stored position of the cursor.

3. The method according to claim 1, further comprising:
in response to monitoring an event of an editing operation directed to the overflowed text in the extended window, performing, without a user request, operations of:
loading the overflowed text to be edited from the extended window into the textbox, thereby causing a new overflow of the length of the textbox;
determining newly-overflowed text as text which has been entered but is not currently displayed in the textbox due to the new overflow;
displaying the newly-overflowed text in the extended window; and
applying the editing operation to the text now loaded into the textbox.

4. The method according to claim 3, wherein before applying the editing operation to the text now loaded into the textbox, the method further comprises:
locating the text now loaded into the textbox to which the editing operation is directed;
placing an operator on the text to which the editing operation is directed; and
receiving an operation command of the editing operation, the command comprising at least one operation of viewing, inserting, deleting, and modifying.

5. The method according to claim 1, wherein the extended window positioned adjacent to the textbox enables the overflowed text iteratively displayed in the extended window to concatenate smoothly to the text in the textbox as the continued entering of the text in the textbox causes the entered text to continue overflowing the length of the textbox.

6. The method according to claim 1, wherein the iteratively displaying overflowed text in the extended window automatically enlarges the extended window as an amount of the overflowed text increases.

7. The method according to claim 1, wherein a size of the extended window is calculated dynamically according to a font size and layout arrangement of the overflowed text.

8. A system of entering text in a textbox, comprising:
a computer comprising a processor; and
instructions which are executable, using the processor, to implement functions comprising:
monitoring an event of entering text in a textbox of a fixed length and having a visible boundary;
responsive to the monitored event detecting that entering the text overflows the length of the textbox, performing:
automatically providing an extended window for displaying overflowed text, without a user request for the extended window, wherein the extended window is positioned adjacent to, but separate and distinct from, the textbox; and
iteratively displaying overflowed text in the extended window, while the monitoring continues to detect that entering the text overflows the length of the textbox and without the user request for the extended window, the overflowed text determined as text which has been entered but is not currently displayed in the textbox due to the overflowing;
automatically closing the extended window and storing a state, the state comprising all the entered text and a context of entering the text, while continuing to display the textbox, in response to monitoring an event that the textbox loses a focus for entering text and without a user request to close the extended window; and
automatically reopening the extended window, redisplaying the overflowed text in the reopened extended window, and redisplaying in the textbox the text that was displayed in the textbox at a time of the monitored event that the textbox lost the focus for entering text, according to the stored state and without a user request to reopen the extended window, in response to monitoring again the event of entering text in the textbox after monitoring the event that the textbox lost the focus.

9. The system according to claim 8, wherein:
the context includes a position of a cursor in the textbox when the focus is lost; and
redisplaying the text in the textbox comprises loading the text in the textbox according to the stored position of the cursor.

10. The system according to claim 8, wherein the functions further comprise:
in response to monitoring an event of an editing operation directed to the overflowed text in the extended window, performing, without a user request:
loading the overflowed text to be edited from the extended window into the textbox, thereby causing a new overflow of the length of the textbox;
determining newly-overflowed text as text which has been entered but is not currently displayed in the textbox due to the new overflow;
displaying the newly-overflowed text in the extended window; and
applying the editing operation to the text now loaded into the textbox.

11. The system according to claim 10, wherein the functions further comprise, before applying the editing:
locating the text now loaded into the textbox to which the editing operation is directed;
placing an operator on the text to which the editing operation is directed; and receiving an operation command of the editing operation, the command comprising at least one operation of viewing, inserting, deleting, and modifying.

12. The system according to claim 8, wherein the extended window positioned adjacent to the textbox enables the overflowed text iteratively displayed in the extended window to concatenate smoothly to the text in the textbox as the continued entering of the text in the textbox causes the entered text to continue overflowing the length of the textbox.

13. The system according to claim 8, wherein the iteratively displaying overflowed text in the extended window automatically enlarges the extended window as an amount of the overflowed text increases.

14. The system according to claim 8, wherein a size of the extended window is calculated dynamically according to a font size and layout arrangement of the overflowed text.

15. A computer program product for entering text in a textbox, the computer program product comprising:
   a non-transitory computer-readable storage medium containing computer-executable program code stored thereon, the computer-executable program code configured for:
   monitoring entering of text in a textbox of a fixed length and having a visible boundary;
   responsive to detecting, by the monitoring, that entering the text overflows the length of the textbox, performing:
      automatically providing an extended window for displaying overflowed text, without a user request for the extended window, wherein the extended window is positioned adjacent to, but separate and distinct from, the textbox; and
      iteratively displaying overflowed text in the extended window, while the monitoring continues to detect that entering the text overflows the length of the textbox and without the user request for the extended window, the overflowed text determined as text which has been entered but is not currently displayed in the textbox due to the overflowing;
   automatically closing the extended window and storing a state, the state comprising all the entered text and a context of entering the text, while continuing to display the textbox, in response to detecting that the textbox loses a focus for entering text and without a user request to close the extended window; and
   automatically reopening the extended window, redisplaying the overflowed text in the reopened extended window, and redisplaying in the textbox the text that was displayed in the textbox at a time of detecting that the textbox lost the focus for entering text, according to the stored state and without a user request r to reopen the extended window, in response to again monitoring entry of text in the textbox after the detecting that the textbox lost the focus.

16. The computer program product according to claim 15, wherein the computer-executable program code is further configured for:
   receiving, from a user, an indication of an editing operation directed to at least a subset of the overflowed text; and
   automatically adjusting the displayed overflowed text in the extended window and the text currently displayed in the textbox, responsive to the receiving, to cause the subset to be moved from the extended window into the textbox while maintaining consistency of an entirety of the entered text.

17. The computer program product according to claim 16, wherein the automatically adjusting further comprises changing the text currently displayed in the textbox to comprise at least the subset.

18. The computer program product according to claim 16, wherein the indication comprises a user click, within the extended window, on text comprising the subset of the overflowed text.

19. The method according to claim 3, wherein:
   the new overflow causes a first portion of the entered text to overflow from a beginning of the textbox and a second portion of the entered text to overflow from an end of the textbox;
   the extended window comprises a first portion adjacent to the beginning of the textbox and a second portion adjacent to the end of the textbox; and
   displaying the newly-overflowed text in the extended window comprises displaying the first portion of the entered text in the first portion of the extended window and displaying the second portion of the entered text in the second portion of the extended window.

* * * * *